United States Patent
Sundaresan

(10) Patent No.: US 10,963,928 B2
(45) Date of Patent: Mar. 30, 2021

(54) CROWDSOURCING SEAT QUALITY IN A VENUE

(71) Applicant: Stubhub, Inc., San Francisco, CA (US)

(72) Inventor: Neel Sundaresan, San Francisco, CA (US)

(73) Assignee: STUBHUB, INC., San Francisco, CA (US)

( * ) Notice: Subject to any disclaimer, the term of this patent is extended or adjusted under 35 U.S.C. 154(b) by 1127 days.

(21) Appl. No.: 14/465,632

(22) Filed: Aug. 21, 2014

(65) Prior Publication Data

US 2016/0055550 A1 Feb. 25, 2016

(51) Int. Cl.
*G06Q 30/02* (2012.01)
*G06Q 50/00* (2012.01)

(52) U.S. Cl.
CPC ......... *G06Q 30/0282* (2013.01); *G06Q 50/01* (2013.01)

(58) Field of Classification Search
CPC ........................... G06Q 30/0282; G06Q 50/01
USPC ...................... 705/347, 5; 715/852
See application file for complete search history.

(56) References Cited

U.S. PATENT DOCUMENTS

| | | | | |
|---|---|---|---|---|
| 8,090,603 B2* | 1/2012 | Payne | ................ | G06Q 30/0601 705/5 |
| 8,239,225 B2* | 8/2012 | Halavais | ................ | G06Q 10/02 705/5 |
| 8,355,937 B2* | 1/2013 | Halavais | ................ | G06Q 10/02 705/5 |
| 8,671,001 B1* | 3/2014 | Thompson | ............. | G06Q 10/02 705/5 |
| 8,990,124 B2* | 3/2015 | Tsaparas | ............... | G06F 16/313 705/347 |
| 9,104,771 B2* | 8/2015 | Bank | ...................... | G06F 16/954 |
| 9,600,781 B2* | 3/2017 | Zamer | ................... | G06Q 10/02 |
| 2002/0082879 A1* | 6/2002 | Miller | ................... | G06Q 10/02 705/5 |
| 2002/0099576 A1† | 7/2002 | MacDonald | | |
| 2005/0192930 A1* | 9/2005 | Hightower | ............. | G06Q 30/02 |
| 2007/0179863 A1† | 8/2007 | Stoll | | |
| 2008/0109491 A1* | 5/2008 | Gupta | ................ | G06F 16/9535 |
| 2008/0162296 A1* | 7/2008 | Hanif | .................... | G06Q 30/08 705/26.1 |
| 2008/0255889 A1* | 10/2008 | Geisler | .................. | G06Q 10/02 705/5 |
| 2008/0281644 A1* | 11/2008 | Payne | .................... | G06Q 10/02 705/5 |
| 2009/0063247 A1* | 3/2009 | Burgess | ................ | G06Q 30/02 705/7.34 |

(Continued)

OTHER PUBLICATIONS

RateYourSeats (https://www.rateyourseats.com/. Jan. 9, 2011.).*

(Continued)

*Primary Examiner* — Andrew B Whitaker
*Assistant Examiner* — Johnathan J Lindsey, III
(74) *Attorney, Agent, or Firm* — Maschoff Brennan

(57) ABSTRACT

Systems and methods for crowdsourcing seat quality are provided. An example method for crowdsourcing seat quality includes receiving an indication of user interest in an event taking place at a venue, determining information about a seat in the venue from previous users of the seat, and displaying a seat map with the information about a seat of the at least one seat.

17 Claims, 11 Drawing Sheets

(56) References Cited

U.S. PATENT DOCUMENTS

| | | | | |
|---|---|---|---|---|
| 2009/0083096 | A1* | 3/2009 | Cao | G06Q 30/02 |
| | | | | 705/7.32 |
| 2009/0276364 | A1* | 11/2009 | Iaia | G06Q 10/02 |
| | | | | 705/80 |
| 2010/0138874 | A1* | 6/2010 | Deutschman | G06Q 10/02 |
| | | | | 725/60 |
| 2010/0174510 | A1* | 7/2010 | Greco | G06T 1/00 |
| | | | | 703/1 |
| 2011/0238497 | A1* | 9/2011 | Milne | G06Q 10/02 |
| | | | | 705/14.49 |
| 2012/0078667 | A1* | 3/2012 | Denker | G06Q 30/0643 |
| | | | | 705/5 |
| 2012/0078829 | A1* | 3/2012 | Bodor | G06F 16/435 |
| | | | | 706/45 |
| 2012/0173310 | A1* | 7/2012 | Groetzinger | G06Q 30/0207 |
| | | | | 705/14.1 |
| 2012/0221479 | A1* | 8/2012 | Schneck, III | G06Q 30/0631 |
| | | | | 705/347 |
| 2012/0226589 | A1* | 9/2012 | Geisler | G06Q 10/02 |
| | | | | 705/27.1 |
| 2013/0059598 | A1* | 3/2013 | Miyagi | H04W 4/023 |
| | | | | 455/456.1 |
| 2013/0124234 | A1* | 5/2013 | Nilsson | G06Q 30/06 |
| | | | | 705/5 |
| 2013/0144666 | A1* | 6/2013 | Denker | G06Q 10/02 |
| | | | | 705/5 |
| 2013/0268899 | A1* | 10/2013 | Valentino | G06Q 10/02 |
| | | | | 715/852 |
| 2014/0115498 | A1* | 4/2014 | Jackson | G06F 17/30528 |
| | | | | 715/753 |
| 2014/0164954 | A1† | 6/2014 | Romanowski | |
| 2014/0258169 | A1* | 9/2014 | Wong | G06O 30/0282 |
| | | | | 705/347 |
| 2014/0274153 | A1* | 9/2014 | Greco | H04W 4/21 |
| | | | | 455/456.3 |
| 2014/0289261 | A1* | 9/2014 | Shivakumar | G06Q 10/101 |
| | | | | 707/748 |
| 2015/0100354 | A1* | 4/2015 | Horowitz | G06Q 10/02 |
| | | | | 705/5 |
| 2015/0134371 | A1* | 5/2015 | Shivakumar | G06Q 50/01 |
| | | | | 705/5 |
| 2015/0161525 | A1* | 6/2015 | Hirose | G06Q 10/02 |
| | | | | 705/5 |
| 2015/0161529 | A1* | 6/2015 | Kondaji | G06Q 10/063 |
| | | | | 705/7.11 |
| 2015/0161686 | A1* | 6/2015 | Williams | G06Q 30/0282 |
| | | | | 705/347 |
| 2015/0262264 | A1* | 9/2015 | Appel | G06Q 30/0282 |
| | | | | 705/347 |
| 2015/0262265 | A1* | 9/2015 | Zamer | G06Q 30/0282 |
| | | | | 705/347 |
| 2016/0012515 | A1* | 1/2016 | Cronin | G06Q 50/12 |
| | | | | 705/15 |
| 2016/0055430 | A1* | 2/2016 | Naji | G06Q 50/01 |
| | | | | 705/5 |

OTHER PUBLICATIONS

RateYourSeats ("About," http://rateyourseats.com/about.php. Jun. 2014; "Write a Seat Review," http://rateyourseats.com/venues-to-rate.php. Jun. 2014; "Rate Your Seats at American Airlines Center (Basketball Game)," http://rateyourseats.com/addrating.phpvenue_id=american-airlines-center-nba. Jul. 2014). (Year: 2014).*

RateYourSeats ("About," http://rateyourseats.com/about.php; "Write a Seat Review," http://rateyourseats.com/venues-to-rate.php; "Rate Your Seats at American Airlines Center (Dallas Mavericks / Basketball Game)," http://rateyourseats.com/addrating.php?venue_id=american-airlines-center-nba) (Year: 2014).*

McWilliams ("Rate Your Seats lets fans review their stadium experience," https://www.ticketnews.com/2011/06/rate-your-seats-lets-fans-review-their-stadium-experience/. Jun. 28, 2011.) (Year: 2011).*

RateYourSeats ("About," http://rateyourseats.com/about.php.; "Write a Seat Review," http://rateyourseats.com/venues-to-rate.php.; "Rate Your Seats at American Airlines Center (Dallas Mavericks / Basketball Game)," http://rateyourseats.com/addrating.php?venue_id=american-airlines-center-nba. Jul. 1, 2014) (Year: 2014).*

Hanson ("Compare Ticket Prices for Games and Concerts," Rate Your Seats Blog. Feb. 10, 2014. https://www.rateyourseats.com/blog/cheap_seats/rateyourseats-ticket-comparison-tables)(Year: 2014).*

Hanson ("Welcome to Rate Your Seats," Rate Your Seats Blog. Jan. 3, 2011. https://www.rateyourseats.com/blog/cheap_seats/welcome-to-rate-your-seats) (Year: 2011).*

EIC 3600 Search Report (Request Originally Filed Dec. 6, 2019) (dated 2019).*

Kelvin Yuan, "Method for dynamic ranking of products and services based on repeated purchase intent and actions," IPOS Pub. No. SG185161A1 (Nov. 29, 2012), available at https://worldwide.espacenet.com/patent/search/family/047504419/publication/SG185161A1?q=SG%20185161%20A1 (Year: 2012).*

Hao Liao et al., Ranking Reputation and Quality in Online Rating Systems, 9 PLOS One 5 (May 2014), available at https://journals.plos.org/plosone/article?id=10.1371/journal.pone.0097146 (Year: 2014).*

RateYourSeats ("About," http://rateyourseats.com/about.php. Jul. 25, 2014; http://rateyourseats.com/venues-to-rate.php. Jun. 25, 2014; "Rate Your Seats at American Airlines Center (Dallas Mavericks / Basketball Game)," http://rateyourseats. com/addrating.php?venue_id=american-airlines-center-nba. Jul. 1, 2014). (Year: 2014).*

McWilliams, "Rate Your Seats lets fans review their stadium experience," https://www.ticketnews.com/2011/06/rate-your-seats-lets-fans-review-their-stadium-experience/. Jun. 28, 2011. (Year: 2011).*

EIC 3600 Search Report 102720 (dated 2020).*

EIC 3600 Refocus Search Report 102820 (dated 2020).*

RateYourSeats (http://www.rateyourseats.com; http://rateyourseats.com/about.php.;http://rateyourseats.com /venues-to-rate.php.; http://rateyourseats.com/addrating.php?venue_id=university-of-phoenix-stadium-nfl.; http://rateyourseats.com/showratings/sections/ratings.php?rating_id=1235. Jul. 16, 2014) (Year: 2014).*

Liao (Hao Liao et al., Ranking Reputation and Quality in Online Rating Systems, 9 PLOS One 5 (May 2014), available at https://journals.plos.org/plosone/article?id=10.1371/journal.pone.0097146). (Year: 2014).*

Kelvin Yuan, "Method for dynamic ranking of products and services based on repeated purchase intent and actions," IPOS Pub. No. SGI85161A1 (Nov. 29, 2012), available at https://worldwide.espacenet.com/patent/search/family/047504419/publication/ (Year: 2012).*

\* cited by examiner
† cited by third party

Section 106C:

Seat 504 (Grade: B):
User 1: This seat was dirty from spilled soda but had a great view of the stage (Grade: C).
User 2: Would have been perfect had this seat been clean. It was sticky from something (Grade: B).
User 3: Great seat! It's very close and you won't be disappointed (Grade: A).

Seat 506 (Grade: A):
User 3: Great seat! It's very close and you won't be disappointed (Grade: A)
User 4: Best seat in the house! (Grade: A).

FIG. 6

CROWDSOURCING SEAT QUALITY IN A VENUE

BACKGROUND

Field of the Invention

The present disclosure generally relates to venue seating, and more particularly to systems and methods for providing a quality rating for a seat at a venue.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Tickets for entertainment events may be purchased using online and/or mobile payment systems such as those provided above. Online marketplaces such as, for example, those provided by StubHub, a subsidiary of EBay Inc. of San Jose, Calif., may provide services for buyers and sellers of tickets for such entertainment events, and payment provider systems may enable users to buy and/or sell those tickets to other users.

However, the services provided by such payment service providers and online marketplaces are typically limited to the connecting of buyers and sellers of tickets and the providing for the purchase transactions for those tickets. The present disclosure contemplates several aspects of entertainment events that may be improved using data collected by online marketplaces and/or payment service providers.

BRIEF DESCRIPTION OF THE FIGURES

FIG. 6 is a screen shot view illustrating an embodiment of a user device displaying user's comments about grades assigned to seats;

DETAILED DESCRIPTION

The present disclosure provides systems and methods for crowdsourcing the quality of a seat at a venue having multiple seats. An event may take place at the venue, and users may purchase tickets to the event. Unfortunately, before users purchase tickets they may be unsure about the quality of a particular seat. It may be desirable to provide potential ticket purchasers with information regarding the quality of a seat. In an embodiment, a set of one or more users that have occupied a seat at a venue is determined, and user experience information regarding a quality of the seat at the venue is retrieved. The retrieved user experience information is from the set of users and represents their experience sitting at that seat. User experience information may refer to personal knowledge and information that is experienced by a user. In an example, a request is sent to a user for user experience information regarding a quality of the seat at the venue. In another example, a user goes to the ticketing website on which the ticket was bought and provides the user experience information. At least a subset of the received user experience information regarding the quality of the seat may be displayed to potential ticket purchasers. Additionally, when a potential purchaser views a seating chart of the venue, the particular seat displayed in the seating chart may be annotated with information regarding the quality of the seat (e.g., the user experience information). The individual seat information may be specific to an event or type of event at the venue such that the same seat and the same venue for the same user may have different information for different events.

Purchase information may be stored regarding ticket purchases. For example, an identification of the customer (e.g., name and e-mail addresses) and the seats assigned to the customer may be stored in a database. In an embodiment, a set of quality ratings for a seat at a venue is received. To ensure that the quality ratings for the seat are accurate, each of the quality ratings may be from a user who has been assigned to the seat. A grade for the seat may be calculated based on one or more quality ratings of the set of received quality ratings. The grade may be calculated in multiple ways (e.g., determining a weighted average). The calculated grade may be assigned to the seat and displayed to potential ticket purchasers in order for the potential ticket purchasers to have a better understanding of other users' experiences of sitting at that seat. Additionally, when a potential purchaser views a seating chart of the venue, the seat displayed in the seating chart may be annotated with information regarding the quality of the seat (e.g., the quality rating).

Figure 1:
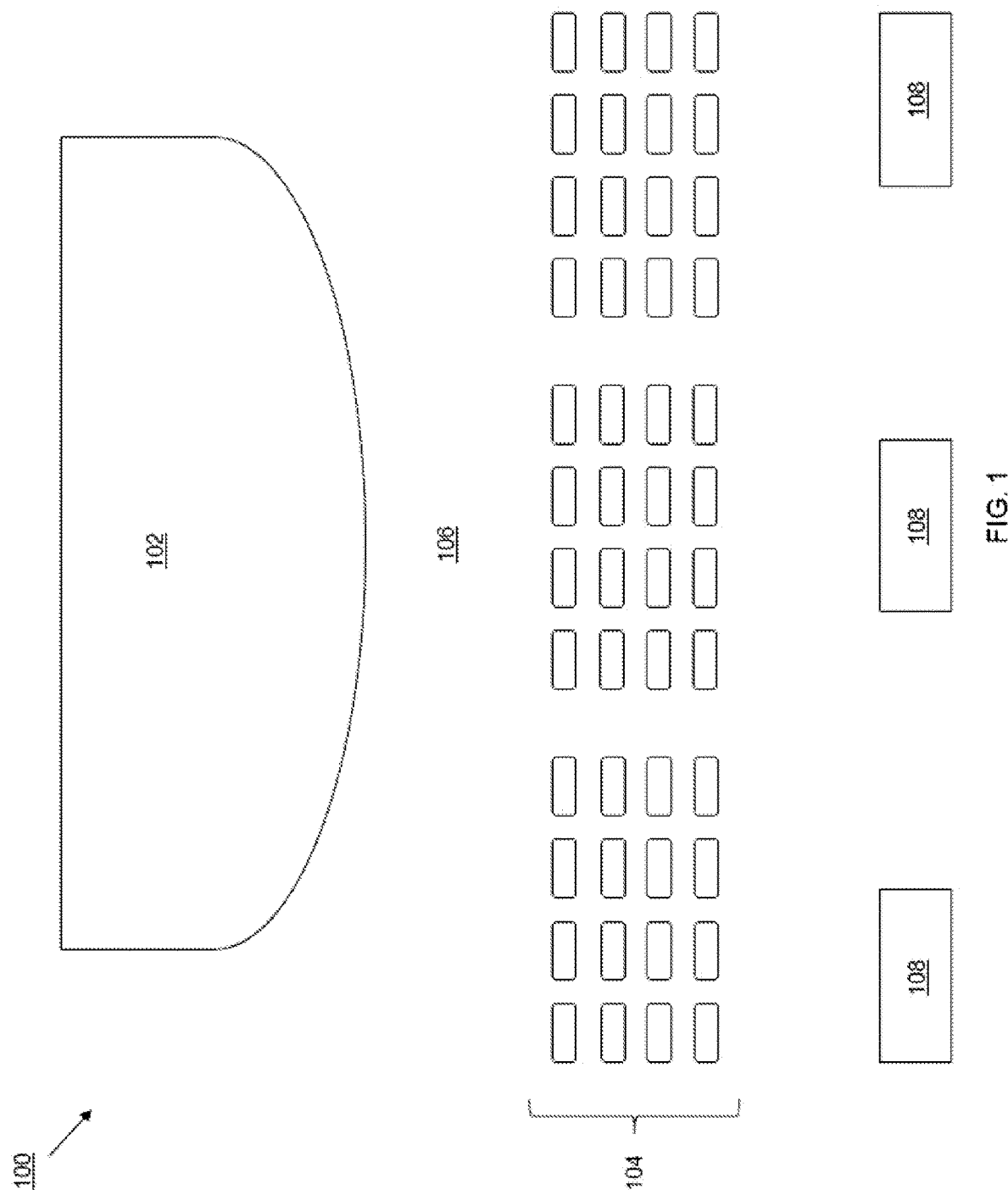
FIG. 1 is a schematic top view illustrating an embodiment of an event venue.

Referring now to FIG. 1, an embodiment of a venue 100 is illustrated. The illustrated embodiment of the venue 100 includes a stage 102, a seating area 104, a standing area 106 between the stage 102 and the seating area 104, and a plurality of vendor areas 108. As discussed in further detail below, the venue 100 provides for the occurrence of one or more events associated with one or more event types. An event type may be, for example, a sporting event (e.g., tennis tournament), music concert (e.g., symphony), graduation ceremony, a theatre event (e.g., movie or play), and/or a variety of other events known in the art. One of skill in the art in possession of the present disclosure will recognize that any venue including, for example, music venues providing for music events, sporting venues, theater venues, presentation venues, and/or a variety of other venues at which associated events are held will fall within the scope of the present disclosure. Additionally, the event may be a live event (e.g., play) or a pre-recorded event (e.g., screening of a movie).

A user may desire to purchase ticket(s) to an event being held at the venue 100. A ticket provider may provide ticket(s) to the event through, for example, a website. In an example, the ticket provider maintains a merchant server and receives a payment from the user for tickets to the event. The merchant server may be maintained by anyone or any entity that receives money, which includes charities. For example, a purchase transaction may be a donation to charity. In another example, the ticket provider may provide free tickets to the event, and the user may select seats for the event using the website.

Figure 2:
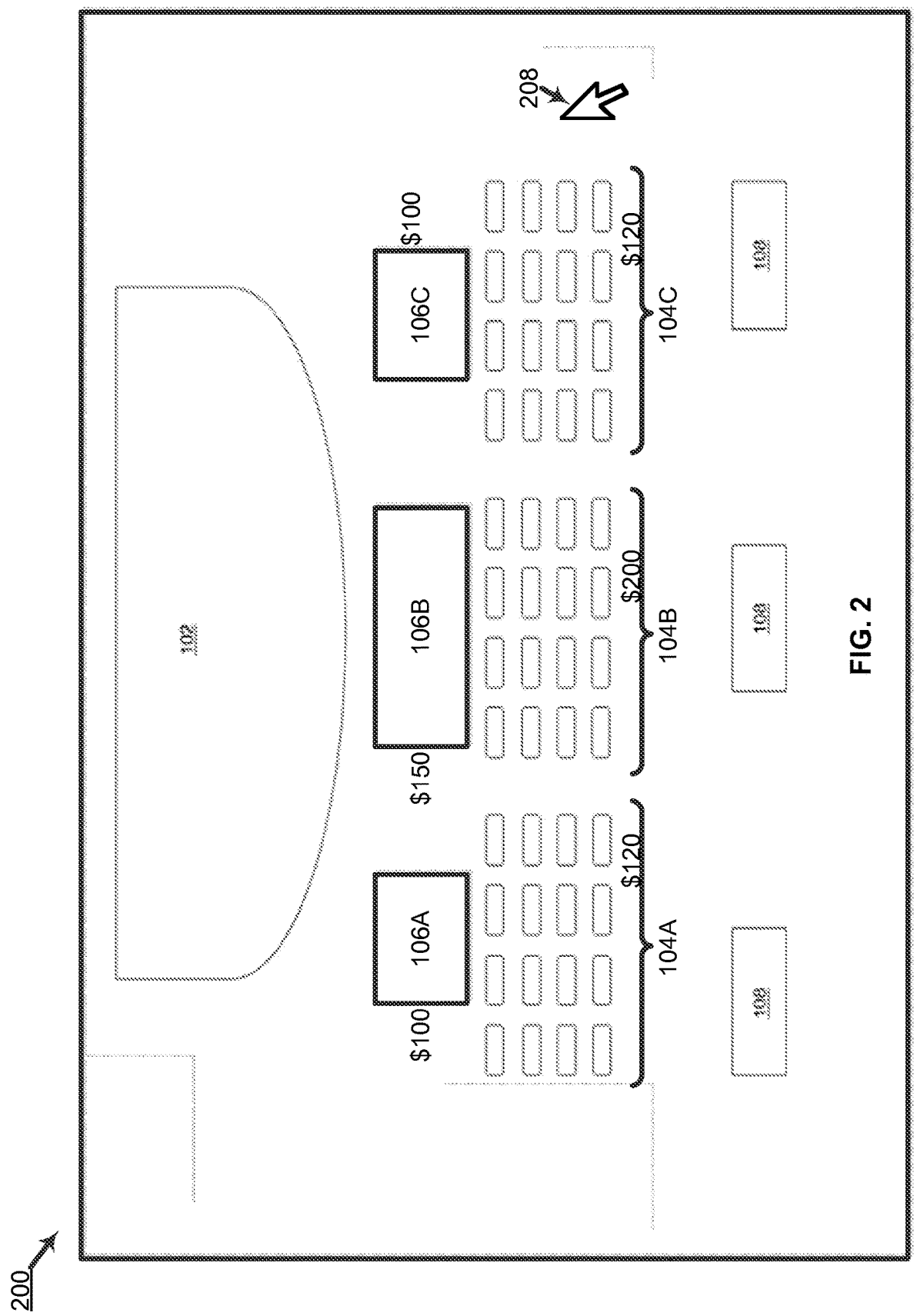
FIG. 2 is a screen shot view illustrating an embodiment of a user device displaying a seating chart for a venue.

Referring now to FIG. 2, an embodiment of a user interface 200 displaying a seating chart of the venue 100 sent to a user device is illustrated. The user interface 200 may be displayed on a display coupled to the user device. The seating chart is a map of where the seats are at the venue 100. By looking at the seating chart the user may have a better idea of where the user would like to sit and what the user's experience may be if the user were to buy tickets for a particular seat and event.

The user may purchase a ticket to an event based on a variety of factors such as the ticket cost and seat availability. In the example seating chart displayed in the user interface 200, different sections are shown along with their costs. The seats in the seating area section 104A are shown as being $120, seats in the seating area section 104B are shown as being $200, seats in the seating area section 104C are shown as being $120, seats in the standing area section 106A are shown as being $100, seats in the standing area section 106B are shown as being $150, and seats in the standing area section 106C are shown as being $100.

The user may, via the user interface 200, purchase a ticket to an event taking place at the venue 100. The user interface 200 may be rendered on a display of a screen and the user may be able to select a section of the seating chart using a cursor 208. In such an example, the user may direct the cursor 208 to a position corresponding to a section displayed in the user interface 200 and click the mouse on that section to indicate the desire to purchase a ticket in that section. The ticket provider may then provide the user with a list of available seats in the selected section. It should be understood that the user may be provided with other ways in which to select seats. In another example, the user interface 200 is rendered on a display of a touch-sensitive screen and the user is able to select a section of the seating chart by tapping the display of the touch-sensitive screen with a finger or a digital stylus. In such an example, the user may touch a position corresponding to the section displayed on the touch-sensitive screen. Additionally, the user interface 200 may allow the user to click on a seat displayed on the user interface 200 to select that particular seat.

The user interface 200 may then display which seats in the selected section are available, and the user may select the desired seats in that section and approve or deny the purchase transaction. If the user approves the purchase transaction for those seats, the user interface 200 may request that the user enter personal information (e.g., full name, e-mail address, and credit card information) and confirm the purchase. In response to the user confirming the purchase, the ticket provider assigns those seats to the user and stores the purchase information in a database. The purchase information may include the user's personal information, cost of the ticket, date of the event, seat assignment(s), and/or other ticket purchasing information known in the art.

Unfortunately, sometimes when users arrive for an event and sit at their assigned seats, the users' experiences of sitting at their assigned seats may be different from what the users anticipated. For example, a pillar or other obstruction may block a substantial portion of a user's view of the stage, the seat may be near an exit door that bangs loudly when closed, or the seat may be near an air conditioning vent that causes the area around the seat to be very cold. These are not aspects that are represented or displayed in the seating chart of the venue 100. Thus, a user may be interested in knowing the experiences of other people who have sat in a particular seat for an event (or have been assigned those seats). The user may be unable to ascertain this information regarding the seat quality of a seat by viewing the seating chart because the seat quality is not based merely on the layout of the venue 100 and the location of a seat. Rather, the experience is personal and may be based on factors not shown in the seating chart.

The user may desire to know whether someone else liked or did not like sitting at that seat, and the user may also benefit from any other user experience information related to that seat. User experience information may refer to personal knowledge and information that is experienced by a user during a previous event held at the venue. Accordingly, before a user confirms the purchase of a ticket to an event, it may be desirable for the user to be provided with user experience information regarding seats for the event.

Quite often, a potential ticket purchaser may have a difficult time finding someone who has sat in a particular seat at the venue 100. Accordingly, it may be desirable for the ticket provider to provide the potential ticket purchaser with useful information regarding the quality of a seat and ensure that the provided information regarding the quality of the seat is from people who have actually sat in that seat in the venue 100.

Crowdsourcing has grown in popularity as social media websites have become more popular. Crowdsourcing is the act of influencing, incentivizing, and leveraging crowds through social media to provide information and help solve problems. In an example, the ticket provider may use the ticketing website as a platform to foster engagement and interaction with people who have previously purchased tickets (and hence have sat in a particular seat or have been assigned to the seat) for an event held at the venue 100 and share user experience information regarding a seat with potential ticket purchasers. In an example, after the date of the event, the ticket provider may send a request to people who have been assigned to seats to provide their own real user experiences from sitting at that seat. Accordingly, the ticket provider may collect seat quality information from people who have actually experienced sitting at particular seats for an event. The decision of potential ticket purchasers to buy or decline tickets for particular seats may be influenced by the seat quality information, and the potential ticket purchasers may have an easier time choosing seats.

In the embodiment illustrated and described below, the venue 100 is providing a music event and has multiple seats from which a potential customer may purchase tickets. Prior to the method 300 discussed below, the customers may have purchased tickets to the event at the venue 100 using, for example, the online marketplaces, payment service providers, and/or system providers discussed in the present disclosure.

In an embodiment, crowdsourcing seat quality includes receiving an indication of user interest in an event taking place at a venue. In an example, an event server receives an indication of user interest in an event taking place at the venue. A user may provide a user request for information regarding the event, the venue, a date on which the event takes place, etc. The event server may receive the indication by, for example, receiving a request for one or more tickets to the event, receiving a request for information about one or events taking place at the venue, receiving a request for information about the venue, receiving a request for information about one or more events taking place at the venue on a same day as the event, receiving a request for information about the event, etc.

The event server may determine information about a seat (e.g., one or more seats) in the venue from previous users of the seat. In an example, the event server may determine the information about the seat by identifying another event that previously took place at the venue and is similar to the event for which the indication of user interest was received. The event server may receive the information about the seat in the venue from a previous user who attended the other event. In such an example, the information entered by the previous user may be a subset of the total information about the seat. The event server may receive one or more indications that the other event is similar to the event for which the indication of user interest was received. In an example, the one or more indications may be from one or more of the previous users and may itself be crowdsourced.

A seat map with the information about the seat may be displayed to a user. In an example, the information entered about the seat from previous users of the seat is displayed in real time to a user. The event server may determine user preferences of the user and display the information entered about the seat based on the user preferences. The displayed information may include the seats and/or information regarding the seats. In an example, user preferences may include a price range, seating sections in the venue, etc. The user's preferences may be entered in accordance with one or more search criteria, as discussed further below.

Figure 3:
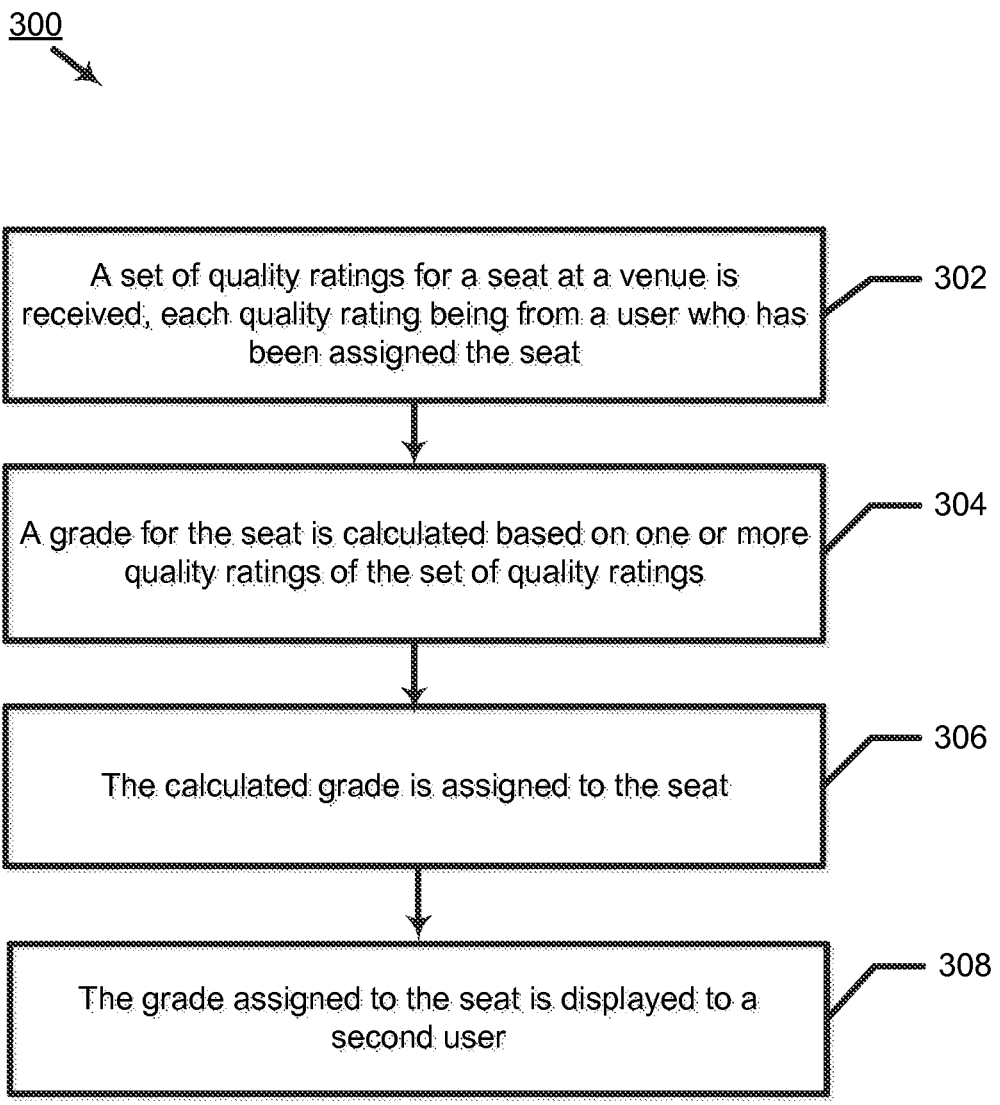
FIG. 3 is an embodiment of a method for crowdsourcing seat quality.

Referring now to FIG. 3, an embodiment of a method 300 for crowdsourcing seat quality is illustrated. In an embodiment, the crowdsourcing seat quality method 300 may be performed by a payment service provider such as, for example, PayPal Inc. of San Jose, Calif. that provides payment services for venues, events, customers, and other entities that allow transactions between those entities. In another embodiment, the crowdsourcing seat quality method 300 may be performed by an online marketplace provider such as, for example, StubHub, a subsidiary of EBay, Inc. of San Jose, Calif. that provides an online marketplace for venues, events, customers, and other entities that allow transactions between those entities. While a few examples of entities that may provide the method 300 are provided above, any ticket provider or third party entity may practice the method 300 while remaining within the scope of the present disclosure.

In embodiments where the payment service provider or online marketplace provider provides the crowdsourcing seat quality method 300, venue operator accounts, event accounts, customer accounts, and/or other identifying accounts may be used, for example, to identify venues, events, customers, and/or other features of the system. However, in other embodiments, the crowdsourcing seat quality method 300 may be performed by the venue operator, the event provider, and/or other system providers while remaining within the scope of the present disclosure. Thus, further references to a "system provider" are meant to include any combination of entities that operate to provide the crowdsourcing seat quality system described herein and perform the crowdsourcing seat quality method 300 discussed below.

Figure 4:
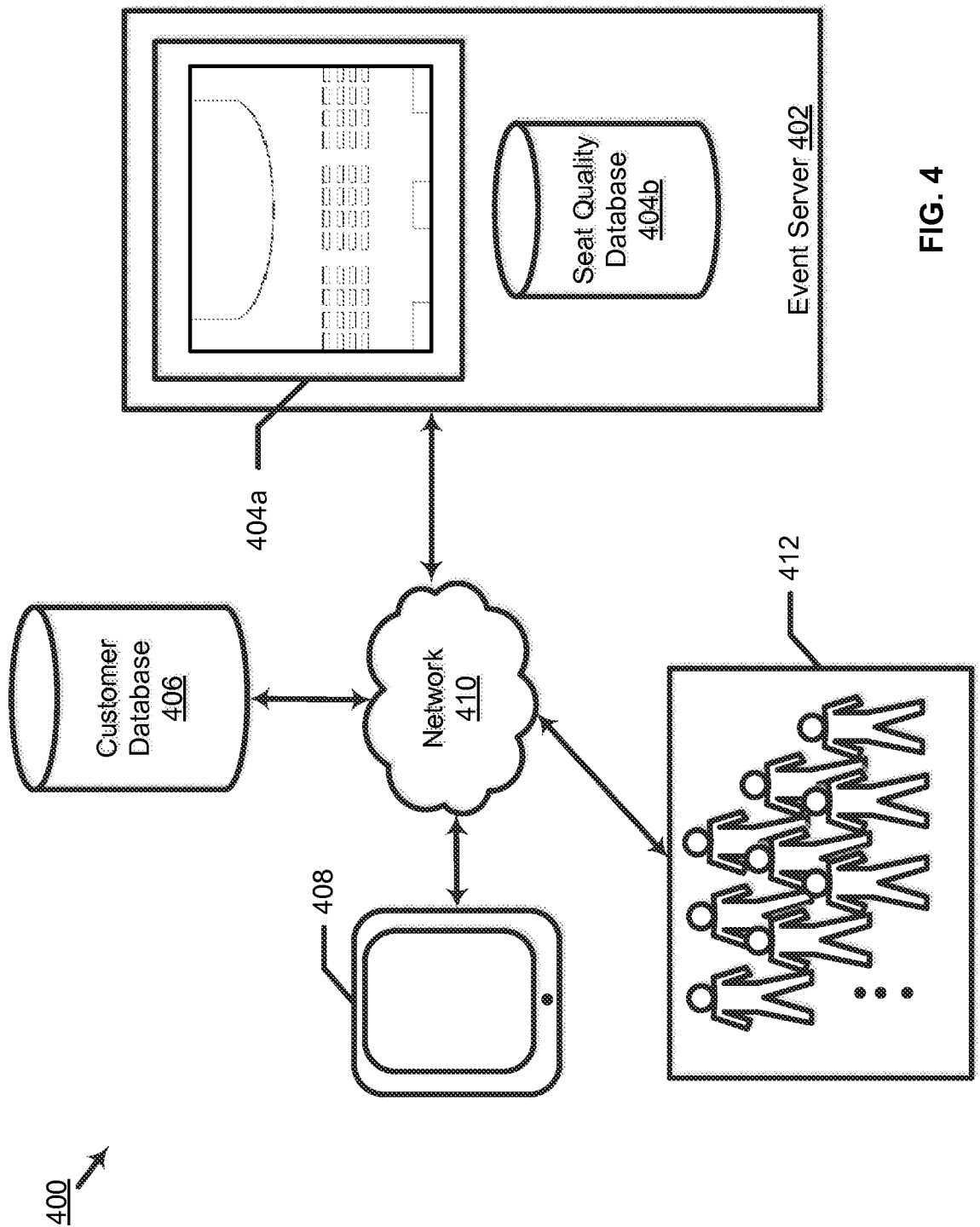
FIG. 4 is an embodiment of a system architecture for crowdsourcing seat quality.

Referring now to FIG. 4, an embodiment of a system architecture 400 for crowdsourcing seat quality is illustrated. The description below will refer to FIGS. 3 and 4 together to explain in further detail how crowdsourcing is used to provide potential customers with user experience information provided by one or more other users regarding a seat at the venue 100. In FIG. 4, system architecture 400 includes an event server 402, customer database 406, and user device 408 coupled over a network 410. The network 410 may be implemented as a single network or a combination of multiple networks. For example, in various embodiments, the network 410 may include the Internet and/or one or more intranets, landline networks, wireless networks, and/or other appropriate types of networks.

The customer database 406 may include customer data such as, for example, customer account information indicating customers who have purchased tickets to the event, seats assigned to customers, and/or any other customer information known in the art. The event server 402 may include venue data 404a that describes the physical layout of the venue 100 (e.g., the seating chart). Event server 402 may also include a seat quality database 404b that stores user experience information regarding seats in the venue 100. The user experience information may include the particular seat (section, row, and seat number) assigned to the user at the venue 100, a quality rating (e.g., grade) for the seat, one or more comments regarding the seat, content associated with the seat (e.g., images provided by a user that previously used the seat), an event type at the venue (e.g., concert), a price paid for the seat, and/or any other information that is being collected or that has been previously collected about the events and/or venues.

While a specific example of the system architecture for crowdsourcing seat quality system 400 is provided, one of skill in the art in possession of the present disclosure will recognize that other information may be stored and accessed by components of the crowdsourcing system depending on the type of event occurring while remaining within the scope of the present disclosure.

After the event has taken place, the event server 402 may determine that a set of users 412 has used a seat at the venue 100 and send a request to the set of users 412 for user experience information regarding the seat assigned to the respective user. The event server 402 enables users to report about their experiences in sitting in a particular seat for an event. The set of users 412 may include one or more users and may be determined by submitting a query to the customer database 406 for the users who have attended a particular event at the venue 100. In response to the request, the event server 402 may be provided with contact information for the users in the set of users 412.

In an example, the event server 402 sends one or more users of the set of users 412 electronic communications (e.g., e-mail) requesting user experience information regarding the seat assigned to the respective user. The electronic communication may include a request for the user to provide a rating of the seat quality for the seat and/or any comments that the user would like to add that affected the seat quality (e.g., that the seat was in the middle of the row and hard to leave to use the bathroom, that the seat was far from a concessions stand, etc.). The e-mail may include the ticketing website's uniform resource locator (URL). If the user selects the URL, the user may be provided with the seating chart of the venue 100 and in particular with a visual object representing the user's seat in the display. In another example, the user may go to the website on which the ticket(s) were purchased and provide feedback regarding the seat quality of a seat. The set of users who respond back to the request for a quality rating for a seat may be a subset of the set of users who have been assigned the seat.

Referring back to FIG. 3, the method 300 begins at block 302 where a set of quality ratings for a seat at a venue is received, each quality rating being from a user who has been assigned the seat. In an embodiment, the event server 402 may access the customer database 406 to determine customer accounts that have purchased tickets to the event occurring at the venue 100. The customer accounts determined to have purchased a ticket to the event occurring at the venue 100 may be associated with seats that were assigned to the customer at the venue 100.

In another embodiment, users may access the website displaying the seating chart of the venue 100, select a particular seat, and provide a quality rating for the seat. To ensure that a user has actually occupied or been assigned that particular seat, event server 402 may request authentication information from the user (such as username and password) and compare the user account information whether the user has been assigned to that seat for an event. As such, quality ratings may only be accepted from a user that has previously purchased and/or used the seat at a previous event.

The event server 402 may request that the user provide a quality rating for the seat. In an example, the quality rating is a grade that indicates the quality of the seat and the user's experience in occupying the seat. The grade may be on a numerical scale (e.g., 1 to 10 rating, with 1 being the worst seat quality and 10 being the best seat quality and a five-star rating with 1 star being the worst seat quality and 5 stars being the best seat quality), on a letter scale (e.g., A to D rating, with D being the worst seat quality and A being the best seat quality), on a "thumbs-up" (i.e., an approval) or "thumbs-down" (i.e., a disapproval) scale, and/or using any other relative rating scale known in the art. It should be appreciated that a particular rating scale may be transformed into another scale. For example, an 8 out of 10 in the 1 to 10 scale may be transformed into four stars in the five-star rating or may be transformed into a B in an A to F rating. In another example, a rating of anything below a 5 in a 1 to 10 scale may mean a "thumbs down" and anything that is a 5 or more in the 1 to 10 scale may mean a "thumbs up". However, a variety of other rating systems will fall within the scope of the disclosure. For example, the rating may be weighted depending on the user providing the review or rating. If one user is typically very critical and rarely gives anything above a 7 although the remarks indicate the user still liked the seat, the user's ratings may be scaled or factored up, as opposed to another user who typically never gives ratings below a 7, even though the narrative indicates that user did not necessarily enjoy the seat with a 7 rating. In that case, the second user ratings may be scaled or factored down. In an example, the weight applied to the review may be zero, in which case the rating is discarded.

As discussed, users may provide comments regarding their assigned seats (e.g., why they graded a seat how they did). For example, the user may indicate that the seat was a B seat given that it was a very cheap ticket and was thus a good deal for the price paid, even despite some negative qualities of the seat. Event server 402 may receive user experience information including one or more quality ratings for seats at the venue 100 and store the information into seat quality database 404b.

The method 300 then proceeds to block 304 where a grade for the seat is calculated based on one or more quality ratings. As discussed, one or more users in the set of users 412 may have provided a grade that indicates a seat quality for an assigned seat. In an example, event server 402 calculates, based on one or more quality ratings of a set of quality ratings for a seat, a grade for the seat.

In an example, for one or more seats at the venue 100, event server 402 calculates an average for N ratings. In another example, for one or more seats at the venue 100, event server 402 calculates a weighted average for N ratings. The weights may be based on factors such as, for example, the reputation of a user who provided the ranking (e.g., a user may have previously provided seat quality ratings, and those ratings may have been confirmed by other users. As such, that user may be assigned a reputation in the system that is weighted relative to other users). Outliers may be discarded or left out from the grade calculations. For example, a standard deviation may be calculated and outliers may be determined based on the standard deviation.

The grade may also be based on the event type. In an example for each event type, the event server 402 may calculate a grade for the seat. A seat may have a different grade for each event type because each event type may provide a different use of the seat. For example, whereas people typically sit down in their seats during a graduation ceremony, during a musical concert people may be more likely to stand up in their seats and/or walk around the venue.

Additionally, individual seat information may be specific to an event or type of event at the venue such that the same seat and the same venue for the same user may have different information for different events. Within a common event type, the event server 402 may calculate a grade for the seat depending on the parties in the event. In an example, the common event has a plurality of categories and the event server 402 calculates a grade for each category of the plurality of categories. For example, a user may have different experiences at a college football game (e.g., common event type) when the home team plays a first university (e.g., first category) compared to a second university (e.g., second category). The event server 402 may provide a grade for seats at the college football game and may also provide a grade for a first category in which the home teach plays the first university and a grade for a second category in which the home teach plays the second university. In such an example, the first university may have a big band that blocks views from particular sections, and the second university may have a small band or no band. Accordingly, within the football game event type, users may have a different experience within the same event type and a potential purchaser of tickets to the college football game may find the separate grades useful.

The method 300 then proceeds to block 306 where the calculated grade is assigned to the seat. In an example, the event server 402 assigns the calculated grade to the seat and stores this information in the seat quality database 404b. A user interested in buying tickets using the system provider's website may desire to see the user experience information of other users who have sat in particular seats.

Figure 5:
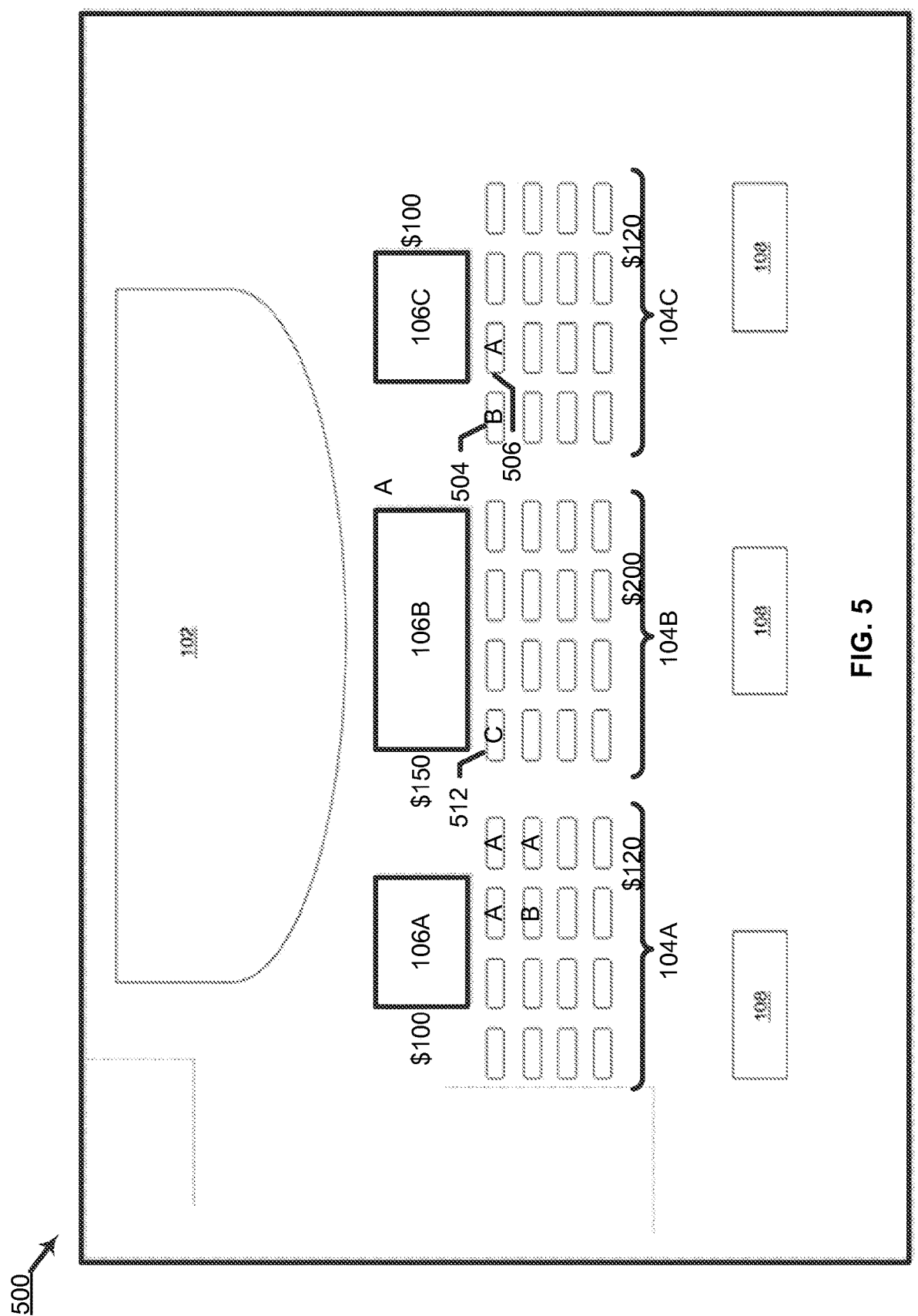
FIG. 5 is a screen shot view illustrating an embodiment of a user device displaying grades assigned to seats in a seating chart.

Referring now to FIGS. 3, 5, and 6, the method 300 then proceeds to block 308 where the grade assigned to the seat is displayed to a second user. The second user may be referred to as a potential ticket purchaser. In FIG. 5, an embodiment of a user interface 500 displaying grades assigned to seats in a seating chart sent to a user device is illustrated. Event server 402 may provide the user interface 500 including a seating chart of the venue 100. In the user interface 500, an "A" has been assigned to the standing section 106B, an "A" has been assigned to three seats and a "B" has been assigned to one seat in the seating area section 104A, a "C" has been assigned to one seat in the seating area section 104B, and a "B" has been assigned to one seat and a "A" has been assigned to one seat in the seating area section 104C. In an example, the map may be specific to the user, such that for the same event and venue, the seat map may have different grades for different users, based on preferences of the different users.

In an embodiment, blocks 302-308 may be performed for any number of occurrences of any number of events across any number of venues. As such, the event server 402 may be filled with event dates, venues, and/or seating information that have been determined for multiple occurrences of an event, etc.

Additionally, it is understood that additional processes may be performed before, during, or after blocks 302-308 discussed above. It is also understood that one or more of the blocks of method 300 described herein may be omitted, combined, or performed in a different sequence as desired.

The seats displayed in the user interface 500 are annotated based on user experience information provided by one or more users. The user experience information may include actual quality ratings provided by one or more users and/or a calculated quality rating based on the user experience information. In an embodiment, the user interface 500 enables one or more users to annotate a seat in the seating chart displayed in the user interface 500. To ensure that users allowed to annotate a seat attended the event and/or occupied the seat, event server 402 may determine whether the user attended the event.

In an example, event server 402 may have access to ticket information via customer database 406 and determine whether the ticket assigned to the user indicates that the user attended the event. For example, persons working at the event may scan users' tickets as they enter the venue and this information may be sent to event server 402 or customer database 406. In response to determining that the ticket assigned to the user indicates that the user attended the event, event server 402 may determine that the user attended the event and enable the user to annotate the seat. In contrast, in response to determining that the ticket assigned to the user indicates that the user did not attend the event, event server 402 may determine that the user did not attend the event and not allow the user to annotate the seat.

In another example, event server 402 may determine whether the user attended the event based information that identifies the user (e.g., the user's email address associated with the ticket). Event server 402 may determine whether the user attended the event in other ways.

The annotation may be, for example, a quality rating that the user gives to the seat assigned to the user or may be a comment regarding the seat. These annotations may appear in the user interface 500 in real time. By viewing the user interface 500, the potential ticket purchaser may have a better idea of what to expect by purchasing a ticket for a particular seat and sitting there.

In an example, each of the sections may be a hyperlink that when selected causes comments, content, and/or other information provided from previous occupiers of seats in the selected section to be displayed. For example, if the potential ticket purchaser selects the seating area section 104C, comments from previous occupiers of seats 504 and 506 may be displayed. The comments may be personal comments that users have provided regarding the particular seat (e.g., a pillar or other obstruction blocks the line of sight to the stage, the bathrooms or concessions are far away from the seat, mobile vendors do not frequent the section that includes the seat, etc.). In some embodiments, the potential ticket purchaser may also be made aware of a particular seat that is less expensive than other seats but has received great reviews.

In FIG. 6, an embodiment of a user interface 600 displaying comments about quality ratings assigned to seats sent to a user device is illustrated. In the illustrated embodiment, three users have commented on seat 504, and two users have commented on seat 506. A ticket potential purchaser may find it useful to view the user experience information of other users to determine whether to purchase particular tickets. For example, the potential ticket purchaser may read the reviews for seat 504 and determine that the user experience information provided by users 1 and 2 may be out dated because user 3 did not complain about the seat being dirty. It should be understood that the quality ratings and/or comments may pop-up based on the user selecting a particular section or seat in the user interface 500 in FIG. 5. The comments may be overlaid on the information already displayed in the user interface 500. In some embodiments, a venue provider may have the opportunity to review the comments provided by previous users of a seat, and provide a comment themselves. For example, using the example of seat 504 in FIG. 6, a venue provider may have reviewed the seat comments about the dirty seat and cleaned up that seat or area. That venue provider may then provide a comment (not illustrated) that is presented in the user interface 600 that indicates that the seat has been cleaned. Similarly, mobile vendors and others operating in the venue may also provide review comments about a seat or section and add their own comments (e.g., a mobile vendor may indicate that a section that was not frequented by mobile vendors previously now has regularly scheduled mobile vendor visits).

In FIG. 6, the same user (user 3) may have provided comments for seats 504 and 506. The event server 402 may allow a user who has purchased multiple tickets to an event to provide user experience information for both seats. Alternatively, the event server 402 may allow a user who has purchased multiple tickets to an event to provide user experience information for only one of the seats.

Figure 7:
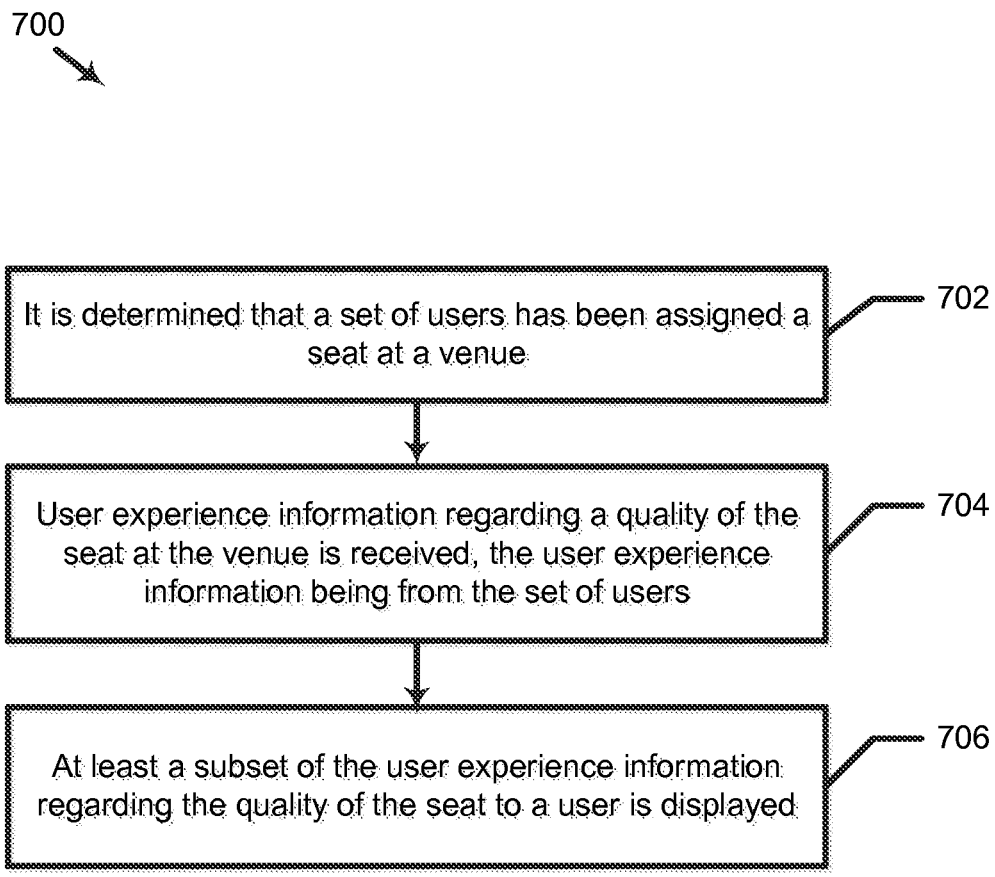
FIG. 7 is an embodiment of a method for crowdsourcing seat quality.

Referring now to FIG. 7, an embodiment of a method 700 for crowdsourcing seat quality is illustrated. The method 700 begins at block 702 where it is determined that a set of users has been assigned a seat at a venue. The event server 402 may determine that the set of users 412 has been assigned a seat at the venue 100.

In an example, the event server 402 may access the customer database 406 to determine customer accounts that have purchased tickets to the event occurring at the venue 100. The customer accounts determined to have purchased a ticket to the event occurring at the venue 100 may be associated with seats that were assigned to the customer at the venue 100.

In another example, users may access the website displaying the seating chart for the venue 100 and select a particular seat and provide a quality rating for the seat. To ensure that a user has actually used that particular seat, event server 402 may request authentication information from the user (e.g., username and password) and compare it with the seating information. In another example, the event server 402 uses an honor system and asks the user to confirm that the seat has been used by the user, who may confirm or deny that it was. In some embodiments, event specific information may be requested from a user that wishes to rate a seat (e.g., a request to describe the weather at the event, a request for an opening act, a request for a score of a game, etc.) in order to attempt to confirm that that user attended the event.

The method 700 then proceeds to block 704 where the user experience information regarding a quality of the seat at the venue is received, the user experience information being from the set of users. In an example, the event server 402 receives user experience information regarding a quality of the seat at the venue 100, where the set of users 412 provides the user experience information. The method 700 the proceeds to block 706 where at least a subset of the user experience information regarding the quality of the seat is displayed to a user. In an example, the event server 402 displays at least a subset of the user experience information regarding the quality of the seat to a user.

In an embodiment, blocks 702-706 may be performed for any number of occurrences of any number of events across any number of venues. As such, the event server 402 may be filled with event dates, venues, and/or seating information that have been determined for multiple occurrences of an event, etc.

Additionally, it is understood that additional processes may be performed before, during, or after blocks 702-706 discussed above. It is also understood that one or more of the blocks of method 700 described herein may be omitted, combined, or performed in a different sequence as desired.

Figure 8:
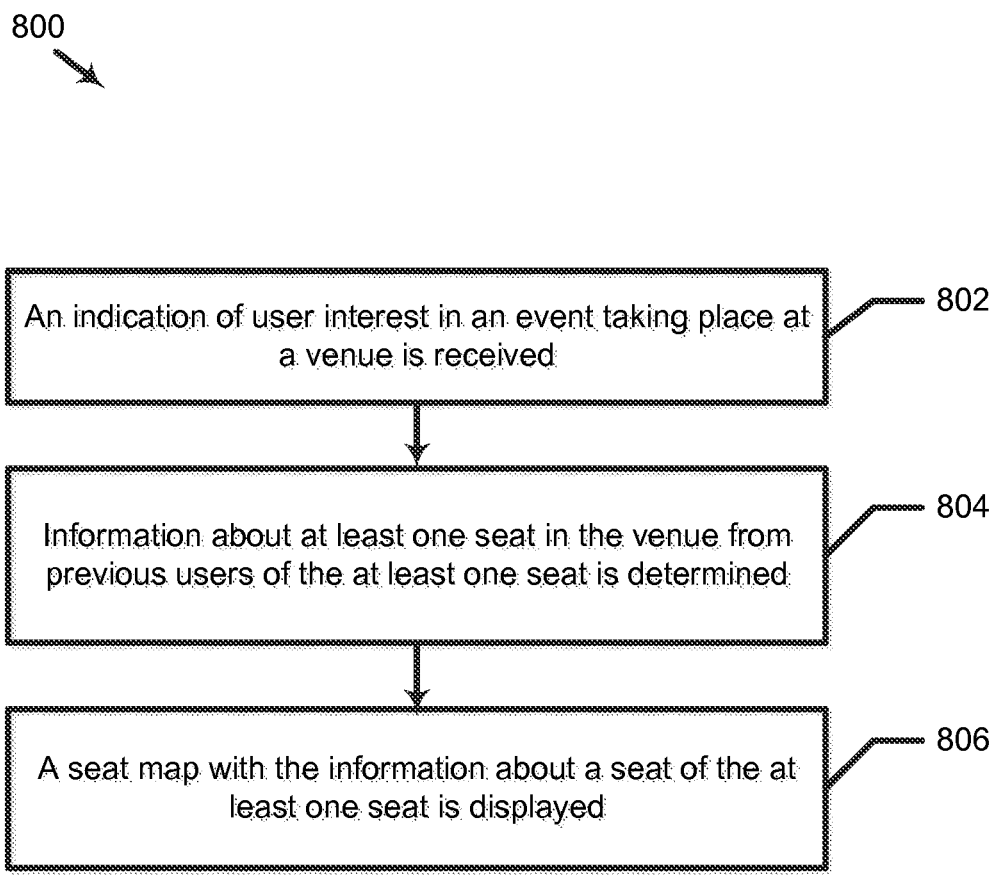
FIG. 8 is an embodiment of a method for crowdsourcing seat quality.

Referring now to FIG. 8, an embodiment of a method 800 for crowdsourcing seat quality is illustrated. The method 800 begins at block 802 where an indication of user interest in an event taking place at a venue is received. The event server 402 may receive an indication of user interest in an event taking place at a venue. The indication may be based on a user input (e.g., a request for information regarding the event, etc.)

The method 800 then proceeds to block 804 where information about at least one seat in the venue from previous users of the at least one seat is determined. In an example, the event server 402 determines information about at least one seat in the venue from previous users of the at least one seat. In an example, the event server 402 determines the information about at least one seat in the venue by identifying another event that previously took place at the venue and is similar to the event and identifying information about one or more seats of the at least one seat in the venue from a previous user who attended the second event.

The method 800 then proceeds to block 806 a seat map with the information about a seat of the at least one seat is displayed. In an example, the event server 402 displays a seat map with the information about a seat of the at least one seat. The server 114 may display in real time information entered by a previous user of the seat. For example, the previous user of the seat may enter information about a particular seat, and the event server 402 may annotate the particular seat with the information (e.g., comments entered by the previous user, a picture taken from the seat, etc.).

In an embodiment, blocks 802-806 may be performed for any number of occurrences of any number of events across any number of venues. As such, the event server 402 may be filled with event dates, venues, and/or seating information that have been determined for multiple occurrences of an event, etc.

Additionally, it is understood that additional processes may be performed before, during, or after blocks 802-806 discussed above. It is also understood that one or more of the blocks of method 800 described herein may be omitted, combined, or performed in a different sequence as desired.

The user experience information that pertains to a seat may be dynamic rather than static. In some embodiments, problems may arise in ensuring that user experience information provided by users is up-to-date. For example, problems such as the dirtiness of a seat or an especially cold seat due to a nearby air conditioning system may be resolved within a time period (e.g., within two years of a bad review). To resolve this issue, the event server 402 may calculate a grade based on ratings from users who have attended events within a particular time period.

Problems may also arise in ensuring that user experience information provided by users is accurate and correctly reflects the user experiences of others who have sat in that particular seat. For example a user who gets cold fast may provide a lower quality rating to a seat compared to other users who were not concerned with the temperature. To determine whether a rating is fairly accurate and should thus be displayed to other users, the event server 402 may calculate a confidence score. In an embodiment, the event server 402 calculates a confidence score for the set of one or more quality ratings for the seat and determines whether the confidence score exceeds a threshold. In response to determining that the confidence score exceeds the threshold, the grade for the seat is displayed.

In an example, the event server 402 may calculate the confidence score by determining a number of users in the set of users. In such an example, the event server 402 may determine whether the confidence score exceeds a threshold by determining whether the number of users who have provided user experience information exceeds the threshold. The threshold may be a threshold number of users who have provided user experience information.

In another example, the event server 402 may calculate the confidence score for one or more users of the set of users who have provided user experience information, and determine a reputation score for each respective user. In such an example, the event server 402 may determine whether the confidence score exceeds a threshold by determining whether a total reputation score for the one or more users exceeds the threshold. In one example, the more times a user has attended an event at the venue 100 (or any other venue), the more reputable the user may be. Additionally, the event server 402 may take into consideration the quality ratings given by a particular user. For example, if a user consistently gives seats a bad quality rating, the event server 402 may consider the user less reputable.

It should be understood that the event server 402 may combine different aspects in calculating the confidence score and/or determining whether the confidence score exceeds the threshold. For example, the event server 402 may combine the number of users and the reputation of users who have provided user experience information to calculate the confidence score and/or determine whether the confidence score exceeds the threshold. The event server 402 may also take into account the cost of the ticket. For example, the event server 402 may combine the cost of the ticket and the seat quality. If the price of a particular ticket for a seat is significantly higher than another seat but has only a slightly better seat quality than the other seat, the event server 402 may rate the particular seat lower. For example, in FIG. 5, a seat 512 in the seating area section 104B costs $200 and is assigned a "C" while seat 506 in the seating area section 104C costs $150 and is assigned an "A". A potential purchaser may be interested in knowing this before buying a ticket for seat 512.

Additionally, a user may provide search criterion to the event server 402 in order to filter out seats for which to purchase tickets. For example, the user may indicate that only available seats having a "B" and up should be displayed because the user would only buy these types of seats. The event server 402 may receive the search criterion and display a set of available seats, where each seat of the displayed set of available seats satisfies the search criterion. Accordingly, the search criterion may be based on a calculated grade and the only seats displayed in the user interface may be available seats with a grade of an "A" or a "B."

In another example, the user may indicate that only available seats having more than 100 reviews should be displayed. The event server 402 may receive the search criterion and display a set of available seats, where each seat of the displayed set of available seats satisfies the search criterion. In another example, the user may indicate that seats should be displayed priced high to low (or low to high) with sections ascending (or descending). The event server 402 may receive the search criterion and display a set of available seats, where each seat of the displayed set of available seats satisfies the search criterion.

It should be understood that the event server 402 may filter out seats based on one or more criterion. For example, a first search criterion may be based on the number of users who have provided user experience information regarding a seat and a second search criterion may tickets below a particular price.

In an embodiment, a user interface displaying a picture may be sent to a user device. In an example, a user may comment on seat 512 and/or provide a picture or other content from seat 512. For example, the user may have uploaded the picture to the ticketing website. In an example, the user's camera may include a global positioning system (GPS) that detects a position of the user and sends the information to the ticketing website. The ticketing website may confirm that the GPS coordinates of where the picture was taken match the GPS coordinates of the seat within a threshold. After the location of the picture has been verified, the event server 402 may display the picture on the ticketing website in association with seat 512. While a specific example of a picture provided from the seat has been provided, other content may be associated with a seat and provided to a potential ticket purchaser while remaining within the scope of the present disclosure. For example, a user may provide a video taken from the seat, audio taken from the seat, etc. In some embodiments, images, video, audio, and/or other content taken from a seat may be automatically uploaded to or retrieved by the ticketing website. In some embodiments, the ticketing website may review a social media webpage that is associated with the user of a seat to determine whether any content is being provided from the seat, and automatically retrieve that content and associate it with the seat. As such, a user need not affirmatively provide content for a seat, but rather that content may be retrieved by the system provider, associated with a seat, and then provided to prospective seat purchasers by the system provider.

Thus, systems and methods have been described that allow for a system provider to crowdsource seat quality information for provision to prospective seat purchasers. The system uses information retrieved from users who have been assigned to a seat by virtue of previously purchasing and attending an event in that seat, and may accept user experience information, content, and/or any other information from those users. That seat information may then be used to determine a quality rating for the seat, and any of that information may be provided to prospective seat purchases in order to allow them to review the experiences by previous users of the seat. Venue providers and/or other entities associated with the venue may also provide information about seats (e.g., to indicate that a problem with a seat has been remedied), and that information may be provided to the prospective seat purchaser as well. The systems and methods provide substantial benefits to prospective seat purchasers in determining whether to purchase a seat for an event, and operate to differentiate a system provider (e.g., a venue operator, a ticketing provider, etc.) from their competitors by reassuring a user that they will be informed of any possible issues with a seat prior to the event that they are attending.

Figure 9:
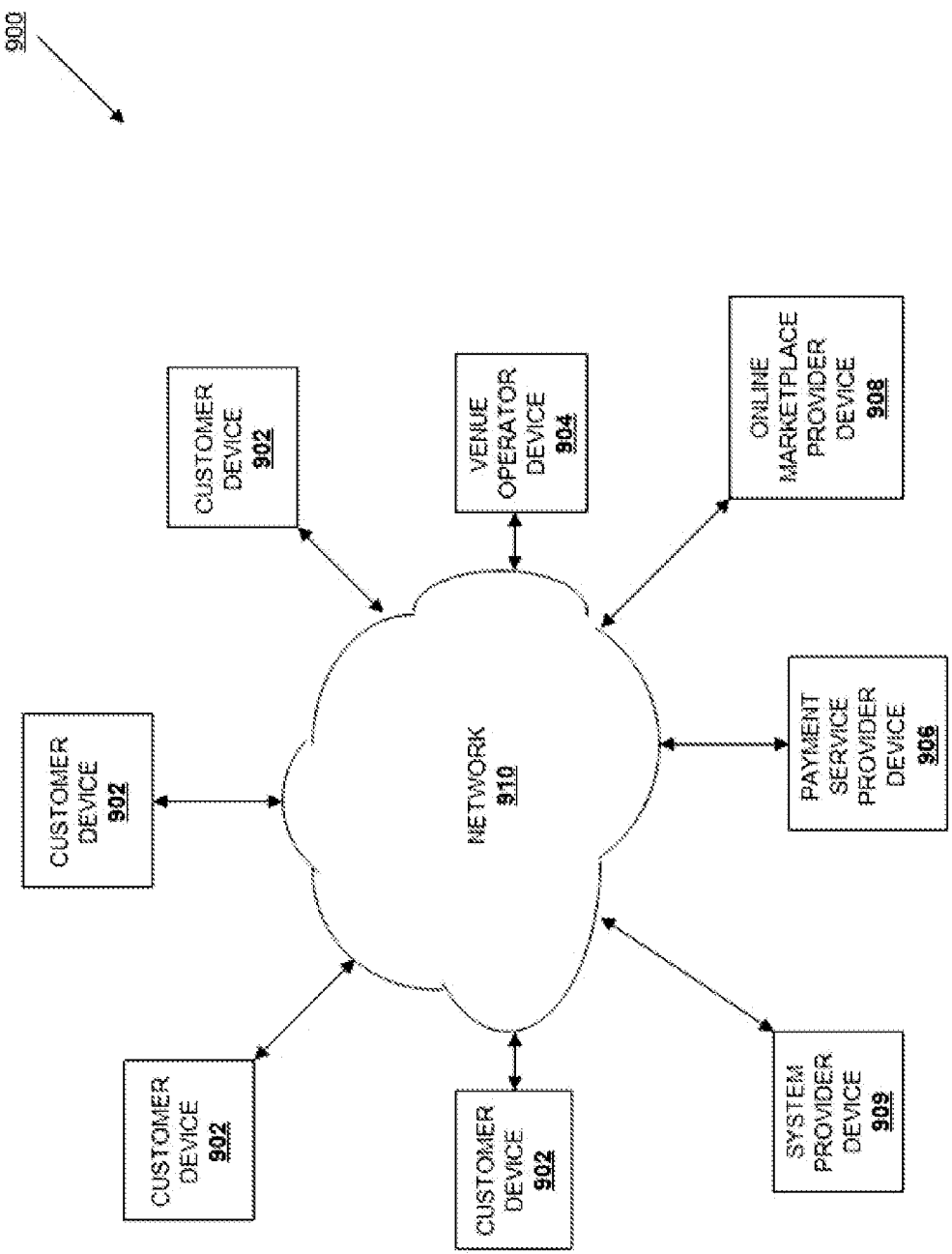
FIG. 9 is a schematic view illustrating an embodiment of a networked system.

Referring now to FIG. 9, an embodiment of a network-based system 900 for implementing one or more processes described herein is illustrated. As shown, the network-based system 900 may include or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 9 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 900 illustrated in FIG. 9 includes a plurality of user devices 902, a venue operator device 904, a payment service provider device 906, an online marketplace provider device 908, and/or a system provider device 909 in communication over one or more networks 910. The user devices 902 may be the user devices discussed above and may be operated by the user discussed above. The payment service provider device 906 may be the payment service provider devices discussed above and may be operated by a payment service provider such as, for example, PayPal Inc. of San Jose, Calif. The online marketplace provider device 908 may be the online marketplace provider devices discussed above and may be operated by a online marketplace provider such as, for example, StubHub, a subsidiary of EBay, Inc. of San Jose, Calif. The system provider devices 909 may be the system provider devices discussed above and may be operated by the system providers discussed above.

The user devices, a venue operator device, a payment service provider device, online marketplace provider device, and/or a system provider device may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 900, and/or accessible over the network 910.

The network 910 may be implemented as a single network or a combination of multiple networks. For example, in various embodiments, the network 910 may include the Internet and/or one or more intranets, landline networks, wireless networks, and/or other appropriate types of networks.

The user devices 902 may be implemented using any appropriate combination of hardware and/or software configured for wired and/or wireless communication over network 910. For example, in one embodiment, the user devices 902 may be implemented as a personal computer of a customer in communication with the Internet. In other embodiments, the user devices 902 may be a smart phone, personal digital assistant (PDA), laptop computer, and/or other types of computing devices.

The user devices 902 may include one or more browser applications which may be used, for example, to provide a convenient interface to permit the customer to browse information available over the network 910. For example, in one embodiment, the browser application may be implemented as a web browser configured to view information available over the Internet.

The user devices 902 may also include one or more toolbar applications which may be used, for example, to provide user-side processing for performing desired tasks in response to operations selected by the user. In one embodiment, the toolbar application may display a user interface in connection with the browser application.

The user devices 902 may further include other applications as may be desired in particular embodiments to provide desired features to the user devices 902. In particular, the other applications may include a payment application for payments assisted by a payment service provider through the payment service provider device 906. The other applications may also include security applications for implementing user-side security features, programmatic user applications for interfacing with appropriate application programming interfaces (APIs) over the network 910, or other types of applications. Email and/or text applications may also be included, which allow user payer to send and receive emails and/or text messages through the network 910. The customer devices 902 includes one or more user and/or device identifiers which may be implemented, for example, as operating system registry entries, cookies associated with the browser application, identifiers associated with hardware of the user devices 902, or other appropriate identifiers, such as a phone number. In one embodiment, the user identifier may be used by the payment service provider device 906 to associate the user with a particular account as further described herein.

Figure 10:
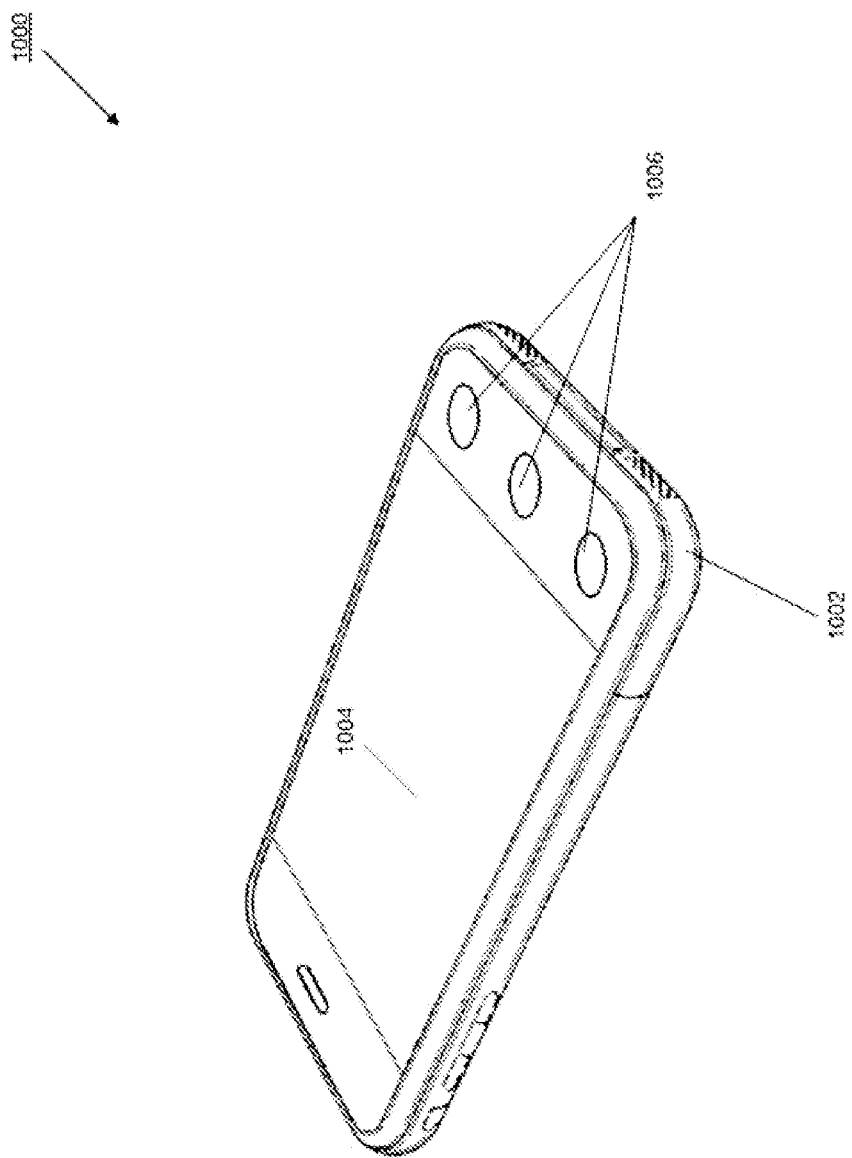
FIG. 10 is a perspective view illustrating an embodiment of a user device.

Referring now to FIG. 10, an embodiment of a user device 1000 is illustrated. The customer device 1000 may be the user devices discussed above. The user device 1000 includes a chassis 1002 having a display 1004 and an input device including the display 1004 and a plurality of input buttons 1006. One of skill in the art will recognize that the user device 1000 is a portable or mobile phone including a touch screen input device and a plurality of input buttons that allow the functionality discussed above with reference to the methods above. However, a variety of other portable/mobile user devices and/or desktop user devices may be used in the methods discussed above without departing from the scope of the present disclosure.

Figure 11:
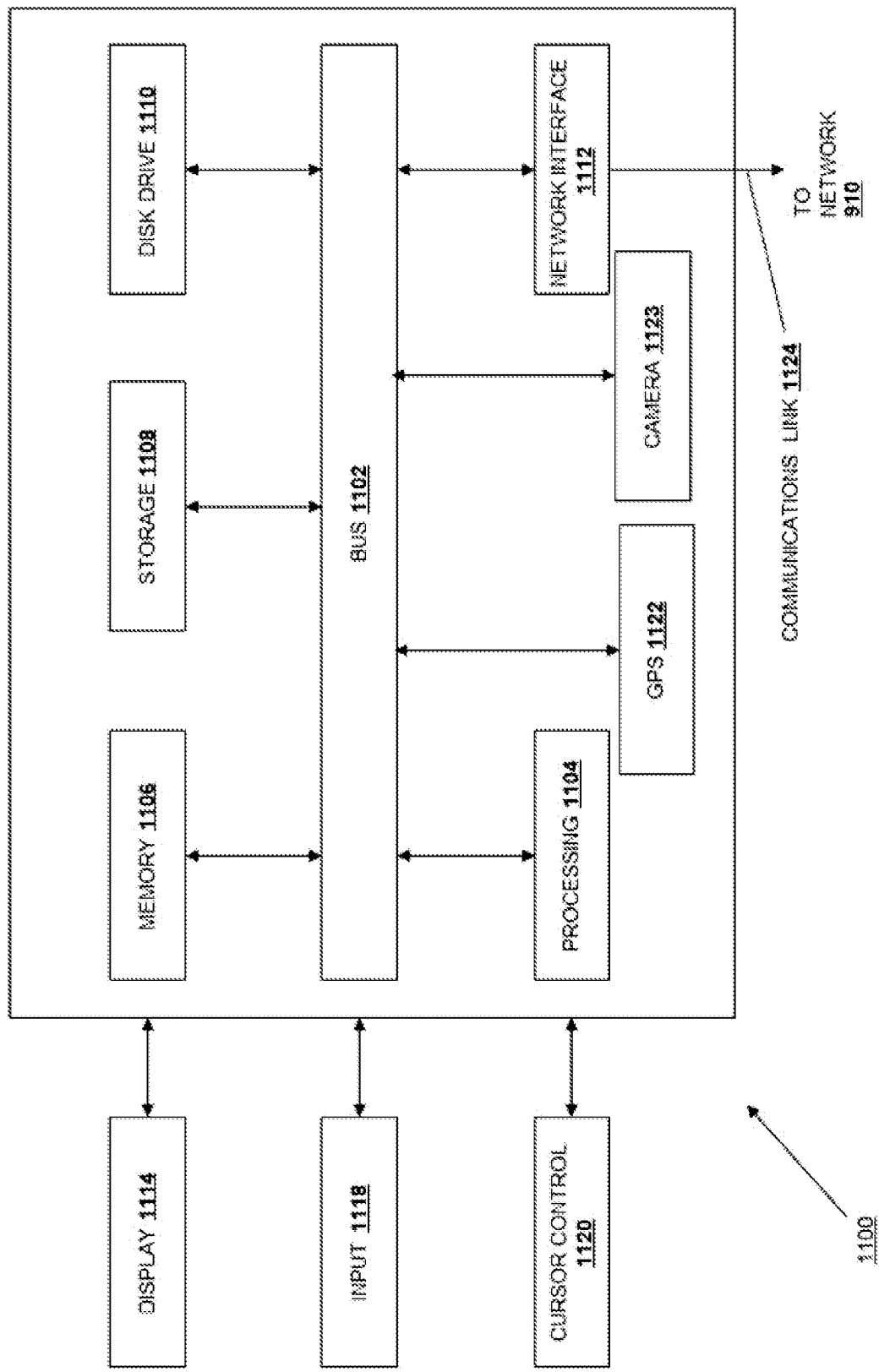
FIG. 11 is a schematic view illustrating an embodiment of a computer system; and Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

Referring now to FIG. 11, an embodiment of a computer system 1100 suitable for implementing, for example, the user devices, venue operator device, payment service provider device, online marketplace provider device, and/or system provider device, is illustrated. It should be appreciated that other devices utilized by customers, venue operators, payment service providers, online marketplace providers, and/or system providers in the system discussed above may be implemented as the computer system 1100 in a manner as follows.

In accordance with various embodiments of the present disclosure, computer system 1100, such as a computer and/or a network server, includes a bus 1102 or other communication mechanism for communicating information, which interconnects subsystems and components, such as a processing component 1104 (e.g., processor, micro-controller, digital signal processor (DSP), etc.), a system memory component 1106 (e.g., RAM), a static storage component 1108 (e.g., ROM), a disk drive component 1110 (e.g., magnetic or optical), a network interface component 1112 (e.g., modem or Ethernet card), a display component 1114 (e.g., CRT or LCD), an input component 1118 (e.g., keyboard, keypad, or virtual keyboard), a cursor control component 1120 (e.g., mouse, pointer, or trackball), a location determination component 1122 (e.g., a Global Positioning System (GPS) device as illustrated, a cell tower triangulation device, and/or a variety of other location determination devices known in the art), and/or a camera component 1123. In one implementation, the disk drive component 1110 may include a database having one or more disk drive components.

In accordance with embodiments of the present disclosure, the computer system 1100 performs specific operations by the processor 1104 executing one or more sequences of instructions contained in the memory component 1106, such as described herein with respect to the customer devices, payment service provider device, and/or system provider device. Such instructions may be read into the system memory component 1106 from another computer readable medium, such as the static storage component 1108 or the disk drive component 1110. In other embodiments, hard-wired circuitry may be used in place of or in combination with software instructions to implement the present disclosure.

Logic may be encoded in a computer readable medium, which may refer to any medium that participates in providing instructions to the processor 1104 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1110, volatile media includes dynamic memory, such as the system memory component 1106, and transmission media includes coaxial cables, copper wire, and fiber optics, including wires that include the bus 1102. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1100. In various other embodiments of the present disclosure, a plurality of the computer systems 1100 coupled by a communication link 1124 to the network 910 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1100 may transmit and receive messages, data, information and instructions, including one or more programs (i.e., application code) through the communication link 1124 and the network interface component 1112. The network interface component 1112 may include an antenna, either separate or integrated, to enable transmission and reception via the communication link 1124. Received program code may be executed by processor 1104 as received and/or stored in disk drive component 1110 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components including software, hardware, and/or both without departing from the scope of the present disclosure. Where applicable, the various hardware components and/or software components set forth herein may be separated into sub-components including software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and user; however, a user or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A crowdsourcing seat quality system, comprising:
   a non-transitory memory storing instructions;
   one or more hardware processors coupled to the memory and operable to execute the instructions from the memory, the execution of the instructions causing the system to perform operations, the operations comprising:
   receiving a seat selection from a previous seat user indicating the previous seat user previously purchased a ticket for a seat for a previous event of an event type at a venue corresponding to the selected seat;
   in response to receiving the seat selection from the previous seat user, determining the seat selection received from the previous seat user matches the seat assigned to the previous seat user for the previous event at the venue;
   in response to determining that the seat selection received from the previous seat user matches the seat assigned to the previous seat user for the previous event at the venue, requesting from the previous seat user authentication information regarding specific events which took place during the previous event;
   determining that the previous seat user attended the previous event by verifying the authentication information received from the previous seat user;
   in response to a determination that the previous seat user attended the previous event, enabling the previous seat user to submit user experience information regarding the seat specific to the event type at the venue, wherein the user experience information includes information regarding the seat as experienced by the previous seat user at the previous event, wherein in response to a determination that the previous seat user did not attend the previous event, the previous seat user is unable to submit user experience information regarding the seat specific to the event type at the venue;
   determining a quality rating for the seat for the event type at the venue, the quality rating based on the user experience information;
   receiving an indication of interest from a prospective seat user of the seat for the event type at the venue; and
   displaying, based on the event type, the quality rating for the seat to the prospective seat user in response to the indication of interest.

2. The system of claim 1, wherein the user experience information is selected from the group consisting of: a rating of the seat and one or more comment regarding the seat.

3. The system of claim 1, the operations further comprising:
   displaying a seating chart for the venue, the seating chart including the seat; and
   enabling the previous seat user to annotate the seat.

4. The system of claim 3, the operations further comprising:
   calculating a confidence score for the user experience information regarding the seat; and
   determining whether the confidence score exceeds a threshold, wherein in response to determining that the confidence score exceeds the threshold, the previous seat user is enabled to annotate the seat.

5. The system of claim 4, wherein the calculating the confidence score includes determining a number of previous seat users in a set of previous seat users, and wherein the determining whether the confidence score exceeds the threshold includes determining whether the number of previous seat users who have provided user experience information exceeds the threshold.

6. The system of claim 1, the operations further comprising:
   providing a user interface including a seating chart of the venue, the seating chart including the seat; and
   enabling one or more previous seat users of a set of previous seat users to annotate the seat on the seating chart of the venue in the user interface.

7. The system of claim 1, the operations further comprising:
sending a request for user experience information regarding the seat to one or more previous seat users of a set of previous seat users.

8. The system of claim 1, wherein determining the quality rating further includes:
determining at least one of an average rating submitted by the previous seat user for the event type, determining a reputation of the previous seat user with respect to accuracy of a rating, discarding an outlier rating of the previous seat user, or a combination thereof.

9. The system of claim 1, where determining the quality rating for the seat for the event type at the venue further includes comparing the user experience information associated with the event type for a price of the ticket with user experience information associated with a second event type for a price of the ticket.

10. A method for crowdsourcing seat quality, comprising:
receiving a seat selection from a previous seat user indicating the previous seat user previously purchased a ticket for a seat for a previous event of an event type at a venue corresponding to the selected seat;
in response to receiving the seat selection from the previous seat user, determining the seat selection received from the previous seat user matches the seat assigned to the previous seat user for the previous event at the venue;
in response to determining that the seat selection received from the previous seat user matches the seat assigned to the previous seat user for the previous event at the venue, requesting from the previous seat user authentication information regarding specific events which took place during the previous event;
determining that the previous seat user attended the previous event by verifying the authentication information received from the previous seat user;
in response to a determination that the previous seat user attended the previous event, enabling the previous seat user to submit user experience information regarding the seat specific to the event type at the venue, wherein the user experience information includes information regarding the seat as experienced by the previous seat user at the previous event, wherein in response to a determination that the previous seat user did not attend the previous event, the previous seat user is unable to submit user experience information regarding the seat specific to the event type at the venue;
determining a quality rating for the seat for the event type at the venue, the quality rating based on the user experience information;
receiving an indication of interest from a prospective seat user of the seat for the event type at the venue; and
displaying, based on the event type, the quality rating for the seat to the prospective seat user in response to the indication of interest.

11. The method of claim 10, wherein the determining the quality rating includes:
identifying a second event type that previously took place at the venue and is similar to the event type; and
identifying user experience information about the seat in the venue from at least one other previous seat user who attended the second event type.

12. The method of claim 11, further including:
receiving the user experience information about the seat in the venue from the at least one other previous seat user.

13. The method of claim 11, wherein the determining the quality rating includes:
receiving one or more indications that the second event type is similar to the event type, the one or more indications being from the previous seat user.

14. The method of claim 10, further including:
determining user preferences, wherein the displaying includes displaying the information about the seat based on the user preferences.

15. The method of claim 10, wherein the displaying includes displaying in real time the information from the previous seat user.

16. A non-transitory computer-readable medium comprising instructions which, in response to execution by a computer system, cause the computer system to perform a method comprising:
receiving a seat selection from a previous seat user indicating the previous seat user previously purchased a ticket for a seat for a previous event of an event type at a venue corresponding to the selected seat;
in response to receiving the seat selection from the previous seat user, determining the seat selection received from the previous seat user matches the seat assigned to the previous seat user for the previous event at the venue;
in response to determining that the seat selection received from the previous seat user matches the seat assigned to the previous seat user for the previous event at the venue, requesting from the previous seat user authentication information regarding specific events which took place during the previous event;
determining that the previous seat user attended the previous event by verifying the authentication information received from the previous seat user;
in response to a determination that the previous seat user attended the previous event, enabling the previous seat user to submit user experience information regarding the seat specific to the event type at the venue, wherein the user experience information includes information regarding the seat as experienced by the previous seat user at the previous event, wherein in response to a determination that the previous seat user did not attend the previous event, the previous seat user is unable to submit user experience information regarding the seat specific to the event type at the venue;
determining a quality rating for the seat for the event type at the venue, the quality rating based on the user experience information;
receiving an indication of interest from a prospective seat user of the seat for the event type at the venue; and
displaying, based on the event type, the quality rating for the seat to the prospective seat user in response to the indication of interest.

17. The non-transitory computer-readable medium of claim 16, wherein the user experience information further includes comments provided by the previous seat user.

* * * * *